US00RE38959E

(19) United States
(12) Reissued Patent
Kohli

(10) Patent Number: US RE38,959 E
(45) Date of Reissued Patent: Jan. 31, 2006

(54) GLASSES FOR DISPLAY PANELS AND PHOTOVOLTAIC DEVICES

(75) Inventor: Jeffrey T. Kohli, Corning, NY (US)

(73) Assignee: Corning Incorporated, Corning, NY (US)

(21) Appl. No.: 10/141,286

(22) Filed: May 8, 2002

Related U.S. Patent Documents

Reissue of:
(64) Patent No.: 6,060,168
Issued: May 9, 2000
Appl. No.: 08/977,413
Filed: Nov. 24, 1997

U.S. Applications:
(60) Provisional application No. 60/033,603, filed on Dec. 17, 1996.

(51) Int. Cl.
*B32B 9/00* (2006.01)
*C03C 3/087* (2006.01)

(52) U.S. Cl. ..... 428/428; 501/32; 501/66; 501/69; 501/70; 313/523

(58) Field of Classification Search ..... 501/65, 501/66, 69, 70, 32; 428/426; 313/523
See application file for complete search history.

(56) References Cited

U.S. PATENT DOCUMENTS

| | | | | |
|---|---|---|---|---|
| 2,231,811 | A | | 2/1941 | Littleton et al. |
| 2,961,328 | A | * | 11/1960 | Babcock et al. |
| 4,255,198 | A | | 3/1981 | Danielson et al. |
| 4,394,453 | A | * | 7/1983 | Dumbaugh |
| 4,409,337 | A | | 10/1983 | Dumbaugh, Jr. |
| 4,634,683 | A | * | 1/1987 | Dumbaugh, Jr. et al. |
| 4,634,684 | A | * | 1/1987 | Dumbaugh, Jr. et al. |
| 4,666,868 | A | * | 5/1987 | Dumbaugh, Jr. et al. |
| 4,666,869 | A | * | 5/1987 | Dumbaugh, Jr. et al. |
| 5,116,787 | A | * | 5/1992 | Dumbaugh, Jr. et al. |
| 5,116,788 | A | * | 5/1992 | Dumbaugh |
| 5,116,789 | A | * | 5/1992 | Dumbaugh, Jr. et al. |
| 5,244,847 | A | * | 9/1993 | Kushitani et al. ..... 501/66 |
| 5,326,730 | A | * | 7/1994 | Dumbaugh, Jr. et al. |
| 5,374,595 | A | * | 12/1994 | Dumbaugh, Jr. et al. |
| 5,489,558 | A | * | 2/1996 | Moffatt et al. |
| 5,508,237 | A | * | 4/1996 | Moffatt et al. |
| 5,741,746 | A | * | 4/1998 | Kohli et al. |
| 5,770,535 | A | | 6/1998 | Brix et al. |
| 5,811,361 | A | | 9/1998 | Miwa |
| 5,851,939 | A | * | 12/1998 | Miwa ..... 501/70 |
| 6,169,047 | B1 | | 1/2001 | Nishizawa et al. |
| 6,319,867 | B1 | * | 11/2001 | Chacon et al. ..... 501/66 |

FOREIGN PATENT DOCUMENTS

| | | | |
|---|---|---|---|
| EP | 0 576 362 | * | 6/1993 |
| EP | 0 559 389 | | 9/1993 |
| EP | 0 672 629 A2 | * | 2/1995 |
| EP | 0714862 A1 | * | 6/1996 |
| FR | 2 675 795 | * | 4/1992 |
| GB | 479173 | | 1/1938 |
| JP | 60-215547 | * | 10/1985 |
| JP | 61-132536 | * | 6/1986 |
| JP | 361281041 A | * | 12/1986 |
| JP | 64-083538 | | 6/1989 |
| JP | 402133334 A | * | 5/1990 |
| JP | 4-160030 | * | 6/1992 |
| JP | 7-277763 | * | 10/1995 |
| JP | 408295530 A | * | 11/1996 |
| JP | 9-048632 | | 2/1997 |
| JP | 9-156953 | | 6/1997 |
| WO | WO 97/11919 | * | 4/1997 |
| WO | WO 97/11920 | * | 4/1997 |

OTHER PUBLICATIONS

Patent Abstracts of Japan; vol. 013, No. 290, Jul. 5, 1989, JP 01–083538 (Nippon Sheet Glass), Mar. 29, 1989.
Patent Abstracts of Japan, vol. 097, No. 006, Jun. 30, 1997, JP 09–048632 (Nippon Electric Glass) Feb. 18, 1997.
Patent Abstracts of Japan, vol. 097, No. 010, Oct. 31, 1997, JP 09–156953 (Nippon Electric Glass) Jun. 17, 1997.

* cited by examiner

*Primary Examiner*—Stephen Stein
(74) *Attorney, Agent, or Firm*—Maurice M. Klee; Thomas R. Beall

(57) ABSTRACT

An aluminosilicate glass having a composition consisting essentially of, as calculated in weight percent on an oxide basis, of 58–70% $SiO_2$, 12–22% $Al_2O_3$, 3–15% $B_2O_3$, 2–12% CaO, 0–3% SrO, 0–3% BaO, 0–8% MgO, 10–25% MCSB (i.e., MgO+CaO+SrO+BaO), and SrO and BaO in combination being less than 3%.

57 Claims, No Drawings

GLASSES FOR DISPLAY PANELS AND PHOTOVOLTAIC DEVICES

Matter enclosed in heavy brackets [ ] appears in the original patent but forms no part of this reissue specification; matter printed in italics indicates the additions made by reissue.

This application claims the benefit of U.S. provisional application Ser. No. 60/033,603, filed Dec. 17, 1996.

FIELD OF THE INVENTION

The invention relates to a family of aluminosilicate glass compositions exhibiting physical and chemical properties suitable for flat panel display.

BACKGROUND OF THE INVENTION

Liquid crystal displays (LCDs) are passive flat panel displays which depend upon external sources of light for illumination. They are manufactured as segmented displays or in one of two basic configurations. The substrate needs (other than being transparent and capable of withstanding the chemical conditions to which it is exposed during display processing) of the two matrix types vary. The first type is intrinsic matrix addressed, relying upon the threshold properties of the liquid crystal material. The second is extrinsic matrix or active matrix (AM) addressed, in which an array of diodes, metal-insulator-metal (MIM) devices, or thin film transistors (TFTs) supplies an electronic switch to each pixel. In both cases, two sheets of glass form the structure of the display. The separation between the two sheets is the critical gap dimension, of the order of 5–10 $\mu$m.

Intrinsically addressed LCD's are fabricated using metal deposition techniques, typically at temperatures $\leqq$350° C., followed by standard metal etching procedures. As a result, the substrate requirements therefor are often the same as those for segmented displays. Soda-lime-silica glass with a barrier layer has proven to be adequate for most needs. A high performance version of intrinsically addressed LCDs, the super twisted nematic (STN) type, has an added requirement of extremely precise flatness for the purpose of holding the gap dimensions uniform.

Extrinsically addressed LCD's can be further subdivided depending upon the nature of the electrical switch located at each optical element (subpixel). Two of the most popular types of extrinsically (or active matrix, AMLCD) addressed LCD's are those based on either amorphous (a-Si) or polycrystalline (poly-Si) silicon thin film transistors (TFT's).

U.S. Pat. No. 4,824,808 (Dumbaugh, Jr.) lists four desirable properties for a glass to exhibit in order to fully satisfy the needs of a substrate for extrinsically addressed LCD's:

First, that the glass be essentially free of intentionally added alkali metal oxide to avoid the possibility of alkali metal contamination of the TFT;

Second, that the glass be sufficiently chemically durable to withstand the reagents used during the manufacture of the TFT;

Third, that the expansion mismatch between the glass and the silicon present in the TFT array be maintained at a relatively low level even as processing temperatures for the substrates increase; and Fourth, that the glass be capable of being produced in high quality thin sheet form at low cost; that is, it must not require extensive grinding and polishing to secure the necessary surface finish.

Recent improvements in the resolution of extrinsically addressed LCD's have led to the desirability of [a] further glass properties, namely, a high glass strain point, a low density, and a high modulus. Strain point is used as an indication of the thermal shrinkage of the glass. As can be appreciated, the lower the strain point, the greater is this thermal shrinkage. Low thermal shrinkage is desirable for precise alignment during successive photolithographic and other patterning steps during the TFT processing. Consequently, glasses having higher strain points are generally preferred for extrinsically addressed LCD's, particularly those which employ poly-Si TFT technology. Thus, there has been considerable research to develop glasses demonstrating high strain points so that thermal shrinkage is minimized during device processing. Corning Code 1737 glass, which has the highest strain point (666° C.) in the AMLCD substrate industry, is rapidly becoming an industry standard. Concurrent with their high strain points, these glasses often have high melting temperatures, e.g. on the order of 1550–1650° C. Low densities and high modulii are desired to minimize sag during thermal processing and to allow for thinner and lighter displays.

Another technology termed "chip-on-glass" (COG) has further emphasized the need for the substrate glass to closely match silicon in thermal expansion. Thus, the initial LCD devices did not have their driver chips mounted on the substrate glass. Instead, the silicon chips were mounted remotely and were connected to the LCD substrate circuitry with compliant or flexible wiring. As LCD device technology improved and as the devices became larger and required finer resolutions, these flexible mountings became unacceptable, both because of cost and of uncertain reliability. This situation led to Tape Automatic Bonding (TAB) of the silicon chips. In that process the silicon chips and electrical connections to the chips were mounted on a carrier tape, that subassembly was mounted directly on the LCD substrate, and thereafter the connection to the LCD circuitry was completed. TAB decreased cost while improving reliability and increasing the permitted density of the conductors to a pitch of approximately 200 $\mu$m—all significant factors. COG, however, provides further improvement over TAB with respect to those three factors. Hence, as the size and quality requirements of LCD devices increase, COG is demanded for those devices dependent upon the use of integrated circuit silicon chips. For that reason, the substrate glass preferably demonstrate a linear coefficient of thermal expansion closely matching that of silicon; i.e., a linear coefficient of thermal expansion (0°–300° C.) between about $32–39\times10^{-7}$/° C.

It would therefore be desirable to provide a glass substrate having a CTE in the $30–40°\times10^{-7}$/° C. range and a strain point greater than 650° C., more preferably greater than 675° C. A density less than 2.50 g/cm$^3$ and a Young's modulus of greater than 11.0 Mpsi would also be desirable. It would also be desirable for the glass to be capable of being manufactured using the float process.

SUMMARY OF THE INVENTION

The present invention is directed to boro-aluminosilicate glasses having a coefficient of thermal expansion (CTE) between $30–39\times10^{-7}$/° C. over the temperature range of 25°–300° C. and have a composition consisting essentially of as calculated in weight percent on an oxide basis, 58–70 $SiO_2$, 12–22 $Al_2O_3$, 3–15 $B_2O_3$, 0–8 MgO, 2–12 CaO, 0–3 SrO, 0–3 BaO, and SrO+BaO in combination is less than 3. The glasses also preferably employ a combination of MgO, CaO, SrO+BaO (MCSB) between about 10–25 weight percent. Other oxides may include, for example, the transition metals, particularly those in period 4 (such as ZnO and $TiO_2$), as well as $Y_2O_3$, $La_2O_3$, $ZrO_2$, and $P_2O_3$, and those ingredients employed for fining (e.g. $CaSO_4$, $As_2O_3$, $Sb_2O_3$, halides, and so forth). These other oxides listed above should preferably not exceed 5 wt % in total. $Na_2O$ and $K_2O$ content each is preferably kept less than 1 weight percent and more preferably the glasses of the present invention are essentially alkali-free.

More preferably the glass consists essentially of 58–67 $SiO_2$, 15–20 $Al_2O_3$, 5–13 $B_2O_3$, 0–8 MgO, 5–12 CaO, 0–3 SrO, 0–3BaO, and SrO and BaO in combination being less than 3.

Most preferably the glass consists essentially of 58–64 $SiO_2$, 16–19 $Al_2O_3$, greater than 6 and less than 13 $B_2O_3$, 1–8 MgO, 5–11 CaO, 0–3 BaO, and SrO and BaO in combination being less than 3.

The glasses of the present invention exhibit a coefficient of thermal expansion (CTE) in the range of 30–39 (more preferably 31–38, and most preferably 32–38)$\times 10^{-7}$/° C., from 25–300° C. and a high strain point (at least 650° C., preferably greater than 675° C., in order to eliminate or minimize the need for a pre-compaction annealing step. Low density (preferably less than 2.5 g/cm$^3$, most preferably less than 2.4 g/cm$^3$) and high Young's modulus is desirable to minimize display weight and panel sag and at the same time maximize hardness in order to improve resistance to scratching and edge defects.

The glass compositions covered in the present invention disclosure are believed to be well suited to flat glass manufacture via the float process in that they generally: 1) do not necessarily include certain oxides or elements in amounts which are known to be detrimental to the float bath, such as As, Sb, Pb, Bi, Ti; 2) are easily melted (having 200 poise isokom temperatures less than 1600° C., more preferably below 1550° C.); and 3) exhibit liquidus viscosities greater than $10^3$ poise. Moreover, the preferred compositions contain little or no SrO or BaO oxides in order to achieve low density, high Young's modulus, high strain point, and low melting temperature. For this reason, each of the SrO and BaO content is preferably less than 3, more preferably less than 1 (and less than 2 weight percent in combination), and most preferably is essentially zero.

DESCRIPTION OF THE INVENTION

The present invention is concerned with improved glasses for use as flat panel display substrates. In particular, the glasses meet the various property requirements of such substrates. It is believed that glasses of the present invention are capable of being formed using the float glass manufacturing process. To provide flexibility in the melting process, and particularly to enable the production of the glasses via the float process, it is desirable that the glass have several characteristics related to melting properties. For example, a melting temperature (i.e., temperature at which the viscosity is about 20 Pa·s (200 poises)) less than or equal to about 1550° C., and more preferably less than or equal to about 1500° C. More importantly, in order to manufacture the glass via the float glass manufacturing process, it is desirable for the glass to exhibit a viscosity at the liquidus temperature which is greater than 50 [MPa·s] *Pa·s* (500 poises), more preferably greater than 100 [MPa·s] *Pa·s* (1000 poises), and most preferably greater than about 250 [MPa·s] *Pa·s* (2500 poises). In addition, it is desirable that the glass be capable of exhibiting a Liquidus Temperature below about 1250° C., most preferably below about 1200° C.

The preferred glasses in accordance with the present invention have a CTE in the range of 30–39$\times 10^{-7}$/° C., more preferably 31–38$\times 10^{-7}$/° C., and most preferably 32–38$\times 10^{-7}$/° C. The desire for such a CTE is primarily driven by the desire to match the CTE of silicon transistor chips. The glasses of the present invention preferably have a strain point greater than 650° C., more preferably greater than 675° C. A high strain point is desired to help prevent panel distortion due to compaction/shrinkage during subsequent thermal processing. In the most preferred embodiments, the glasses exhibit a combination of desirable CTE's and strain point. For example, the most preferred glasses exhibit a CTE between 31–38$\times 10^{-7}$/° C., in combination with a strain point greater than about 675° C.

Chemical durability generally improves as the ratio of glass formers plus intermediates to glass modifiers increases. It is desirable that glasses for present purposes have a weight loss less than about 5.0 mg/cm$^2$, more preferably less than 2.0 mg/cm$^2$ and most preferably less than 1.0 mg/cm$^2$ after exposure to the 5% HCl solution at 95° C. for 20 minutes. Glasses having compositions within the following oxide ranges in weight percent are generally characterized by wt. loss values less than 5.0 mg/cm$^2$:

| | |
|---|---|
| $SiO_2$ | 58–70 |
| $Al_2O_3$ | 12–22 |
| CaO | 2–12 |
| SrO | 0–3 |
| BaO | 0–3 |
| MgO | 1–8 |
| $B_2O_3$ | 3–15 |
| MgO + CaO + SrO + BaO | 10–25 |
| SrO + BaO | 0–3 |

The present glasses employ 58–70% by weight $SiO_2$ as the primary glass former. Increasing $SiO_2$ content generally improves durability, but raises the melting point. The glasses also comprise 12–22 wt % $Al_2O_3$. As the $Al_2O_3$ content increases, glass durability increases, but CTE decreases and the melting point increases. Boric oxide ($B_2O_3$) decreases melting temperature, but is generally detrimental to HCl durability, and strain point. $B_2O_3$ content is between 3 and 15 percent by weight. Generally speaking MgO and/or CaO can replace $B_2O_3$ to maintain a low CTE, density, Young's modulus and flux the melt. $B_2O_3$ tends to decrease the liquidus temperature and increase the viscosity at the liquidus. However, relatively high levels of $B_2O_3$ are detrimental to HCl durability. The role of MgO and CaO is to limit alkali mobility and flux the melt at relatively high temperatures, while at the same time enabling a high strain point and low density. MgO is limited to 8, more preferably is 1–8, and most preferably is 2–6 weight percent. SrO and BaO in combination are preferably less than 3% more preferably less than 2%, and most preferably are essentially avoided to minimize the formation of $BaSO_4$, $SrSO_4$, as well as to lower the density, increase the strain point, and increase the modulus of the glass.

The invention is further illustrated by the following examples, which are meant to be illustrative, and not in any way limiting, to the claimed invention. TABLE I sets forth exemplary glass compositions in weight percent, as calculated on an oxide basis from the glass batches. These example glasses were prepared by melting 1000–5000 gram batches of each glass composition at a temperature and time to result in a relatively homogeneous glass composition, e.g. at a temperature of about 1550–1600° C. for a period of about 6 to 16 hours in platinum crucibles. Also set forth are relevant glass properties for each glass composition, determined on the glasses in accordance with techniques conventional in the glass art. Thus, the linear coefficient of thermal expansion (CTE) over the temperature range 25°–300° C. expressed in terms of $\times 10^{-7}$/° C., and the softening point (Soft.Pt.), annealing point (Anneal.Pt.), and strain point expressed in terms of ° C. Softening point was measured using the parallel plate method, and annealing point and strain point were both measured using beam bending viscometry.

The internal liquidus temperatures (Liq.Temp.) of the glasses were measured using the standard liquidus method, which involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The 200 poise temperature (in ° C.) (defined as the temperature at which the glass melt demonstrates a viscosity of 200 poises [20 Pa.s]) was calculated employing the Fulcher equation as fit to the high temperature viscosity data. Also listed is Young's modulus, shear modulus and specific modulus (Young's modulus/density), as well as Knoop hardness, which was measured using a 100 gram load.

TABLE I

| wt % | 1 | 2 | 3 | 4 | 5 | A |
|---|---|---|---|---|---|---|
| $SiO_2$ | 60.2 | 60.7 | 60.5 | 62.0 | 61.0 | 57.8 |
| $Al_2O_3$ | 17.8 | 18.0 | 17.9 | 17.0 | 18.0 | 16.5 |
| $B_2O_3$ | 3.8 | 6.5 | 7.1 | 7.1 | 7.1 | 8.5 |
| MgO | 7.6 | 6.1 | 4.3 | 5.8 | 5.8 | .75 |
| CaO | 10.6 | 8.7 | 10.2 | 8.1 | 8.1 | 4.15 |
| SrO | 0.0 | 0.0 | 0.0 | 0.0 | 0.0 | 1.9 |
| BaO | 0.0 | 0.0 | 0.0 | 0.0 | 0.0 | 9.4 |
| Liquidus (° C.) Temperature | 1220 | 1240 | 1210 | 1240 | 1200 | 1090 |
| Soft Pt (° C.) | 947 | 937 | 940 | 945 | 942 | 975 |
| Anneal Pt (° C.) | 739 | 723 | 728 | 730 | 730 | 721 |
| Strain Pt (° C.) | 692 | 677 | 681 | 686 | 683 | 666 |
| CTE ($\times 10^{-7}$/° C.) | 41.5 | 39.5 | 39.0 | 37.3 | 36.5 | 37.8 |
| Density (g/cm$^3$) | 2.575 | 2.501 | 2.459 | 2.459 | 2.466 | 2.544 |
| Young's Modulus (Mpsi) | | | | | 12.0 | 10.2 |
| Shear Modulus (Mpsi) | | | | | 4.8 | 4.1 |
| Specific Modulus (Mpsi · cm$^3$/g) | | | | | 4.9 | 4.0 |
| Knoop Hardness (100 g) | | | | | 505 | 460 |
| 200 Poise Temp (° C.) | | | | | 1515 | 1625 |

| wt % | 6 | 7 | 8 | 9 | 10 |
|---|---|---|---|---|---|
| $SiO_2$ | 61.3 | 62.4 | 63.5 | 62.7 | 62.1 |
| $Al_2O_3$ | 18.1 | 18.0 | 18.9 | 18.7 | 18.5 |
| $B_2O_3$ | 7.2 | 7.1 | 8.4 | 8.3 | 8.2 |
| MgO | 7.4 | 5.2 | 3.0 | 2.2 | 2.2 |
| CaO | 6.0 | 7.3 | 6.2 | 6.2 | 6.1 |
| SrO | 0.0 | 0.0 | 0.0 | 1.9 | 0.0 |
| BaO | 0.0 | 0.0 | 0.0 | 0.0 | 2.8 |
| Liquidus (° C.) Temperature | 1240 | 1240 | >1260 | 1250 | >1250 |
| Soft Pt (° C.) | 943 | 958 | 984 | 985 | 986 |
| Anneal Pt (° C.) | 736 | 738 | 754 | 751 | 748 |
| Strain Pt (° C.) | 691 | 691 | 704 | 700 | 697 |
| CTE ($\times 10^{-7}$/° C.) | 35.8 | 34.3 | 31.0 | 32.7 | 31.0 |
| Density (g/cm$^3$) | 2.458 | 2.442 | 2.397 | 2.416 | 2.431 |

| wt % | 11 | 12 | 13 | 14 | 15 | 16 |
|---|---|---|---|---|---|---|
| $SiO_2$ | 62.8 | 61.9 | 62.7 | 62.4 | 62.5 | 61.5 |
| $Al_2O_3$ | 16.5 | 16.2 | 16.4 | 16.3 | 17.2 | 17.1 |
| $B_2O_3$ | 11.2 | 11.1 | 12.3 | 12.2 | 11.7 | 12.8 |
| MgO | 0.0 | 0.0 | 0.0 | 0.6 | 0.0 | 0.0 |
| CaO | 9.5 | 8.5 | 8.6 | 6.9 | 8.6 | 8.6 |
| SrO | 0.0 | 0.0 | 0.0 | 1.6 | 0.0 | 0.0 |
| BaO | 0.0 | 2.3 | 0.0 | 0.0 | 0.0 | 0.0 |
| Liquidus (° C.) Temperature | 1160 | 1145 | 1110 | 1135 | 1170 | 1185 |
| Soft Pt (° C.) | 959 | 960 | 961 | 959 | 962 | 952 |
| Anneal Pt (° C.) | 730 | 724 | 718 | 711 | 722 | 714 |
| Strain Pt (° C.) | 679 | 671 | 668 | 651 | 670 | 663 |
| CTE ($\times 10^{-7}$/° C.) | 34.7 | 34.4 | 34.3 | 32.8 | 33.6 | 34.5 |
| Density (g/cm$^3$) | 2.389 | 2.419 | 2.370 | 2.381 | 2.377 | 2.371 |

A glass having a composition and properties as shown in Example 5 is currently regarded as representing the best mode of the invention, that is, as providing the best combination of properties for the purposes of the invention at this time. Comparative Example A set forth in Table I represents the compositions and properties of Corning Incorporated's code 1737 glass, currently one of the most popular substrates for LCD applications. Compared to code 1737 glass, Example 5 has a higher strain point (683° C. vs. 666° C. for 1737), lower density (2.45 vs. 2.54 g/cm$^3$), lower softening point (942 vs. 975° C.), higher Young's modulus (12 vs. 10.2 Mpsi), and higher Knoop hardness (505 vs. 460 with 100 g load), yet has a 200 poise temperature of about 1516° C. (vs. 1625 for code 1737 glass), thereby potentially enabling formation of this glass at significantly lower temperatures.

Although the invention has been described in detail for the purpose of illustration, it is understood that such detail is solely for that purpose and variations can be made therein by those skilled in the art without departing from the spirit and scope of the invention which is defined by the following claims. For example, while the glass is described herein primarily as a flat panel display substrate, it may also be used in photovoltaic device applications.

What is claimed is:

1. A substrate for a flat panel display or photovoltaic device wherein said substrate is comprised of a flat, transparent glass exhibiting a linear coefficient of thermal expansion (CTE) over the temperature range 0–300° C. between 30–40$\times 10^{-7}$/° C. and a strain point over [600° C.] *650° C.*, said glass consisting essentially of an aluminosilicate having a composition as calculated in weight percent on an oxide basis, of 58–70% $SiO_2$, 12–22% $Al_2O_3$, [3] 5–15% $B_2O_3$, [2] 5–12% CaO, 0–3% SrO, 0–3% BaO, 0–8% MgO, [and] SrO and BaO in combination being less than 3%*, said glass containing in addition to CaO, at least one of MgO, SrO, and BaO*.

2. A substrate [glass] in accordance with claim 1 [which] *wherein the glass* is manufactured by the float process, said glass having a liquidus viscosity greater than about 50 [MPa·s] *Pa·s* (500 poises).

3. A substrate according to claim 2, wherein said glass has a CTE of 32–38$\times 10^{-7}$/° C. [and a strain point over 650° C.]

4. A substrate according to claim 3, wherein said glass has a strain point over 675° C.

5. A substrate according to claim 3, wherein the combined SrO and BaO content of said glass is less than about 1 weight percent.

6. A substrate according to claim 3, wherein said glass is essentially free of SrO and BaO.

7. A flat panel display comprising a substrate in accordance with claim 1.

8. A substrate according to claim 1, wherein said glass consists essentially of a composition, as calculated in weight percent on an oxide basis, of 58–67%, $SiO_2$, 15–20% $Al_2O_3$, 5–13% $B_2O_3$, 5–12% CaO, 0–3% SrO, 0–3% BaO, 0–8% MgO, and SrO and BaO in combination is less than 3 wt %.

9. A substrate according to claim 3, wherein said glass consists essentially of a composition, as calculated in weight percent on an oxide basis, of 58–67% $SiO_2$, 15–20% $Al_2O_3$, 5–13% $B_2O_3$, 5–12% CaO, 0–3% SrO, 0–3% BaO, 1–8% MgO, and SrO and BaO in combination is less than 3 wt %.

10. A substrate according to claim 9, wherein said glass has a strain point over 675° C.

11. A substrate according to claim 9, wherein the combined SrO and BaO content of said glass is less than about 1 weight percent.

12. A substrate according to claim 9, wherein the glass has a weight loss less than 5.0 mg/cm$^2$ when immersed in 5% HCl at 95° C. for one hour.

13. A substrate [according to claim 1, wherein] *for a flat panel display or photovoltaic device wherein said substrate is comprised of a flat, transparent glass exhibiting a linear coefficient of thermal expansion (CTE) over the temperature range 0–300° C. between 30–40×10$^{-7}$/° C. and a strain point over 600° C.,* said glass consists essentially of *an aluminosilicate having* a composition, as calculated in weight percent on an oxide basis, of 58–64% $SiO_2$, 16–19% $Al_2O_3$, greater than 6 and less than 13% $B_2O_3$, 5–11% CaO, 0–3% SrO, 0–3% BaO, 1–8% MgO, and SrO and BaO in combination being less than 3%.

14. A glass exhibiting a linear coefficient of thermal expansion (CTE) over the temperature range 0–300° C. between 30–40×10$^{-7}$/° C. and a strain point over [600° C.] *650° C.*, said glass comprising an aluminosilicate having a composition as calculated in weight percent on an oxide basis, consisting essentially of 58–70% $SiO_2$, 12–22% $Al_2O_3$, [3] 5–15% $B_2O_3$, [2] 5–12% CaO, 0–3% SrO, 0–3% BaO, 0–8% MgO, and SrO and BaO in combination being less than 3%, *said glass containing in addition to CaO, at least one of MgO, SrO, and BaO.*

15. A glass in accordance with claim 14 which is manufactured by the float process, said glass having a liquidus viscosity greater than about 50 [MPa·s] *Pa·s* (500 poises).

16. A glass according to claim 14, wherein said glass has a CTE of 32–38×10$^{-7}$/° C. [and a strain point over 650° C.]

17. A glass according to claim 16, wherein said glass has a strain point over 675° C.

18. A photovoltaic device comprising a substrate in accordance with claim 1.

19. A [substrate] *glass* according to claim 14, wherein said glass consists essentially of a composition, as calculated in weight percent on an oxide basis, of 58–67% $SiO_2$, 15–20% $Al_2O_3$, 5–13% $B_2O_3$, 5–12% CaO, 0–3% SrO, 0–3% BaO, 1–8% MgO, and SrO and BaO in combination is less than 3 wt %.

20. A substrate according to claim 1, wherein MgO+CaO+SrO+BaO is [10–25] *greater than or equal to 10 and less than 23* weight percent.

21. A substrate according to claim 1, wherein MgO+CaO+SrO+BaO is [8.6–18.2] *8.6–14.8* weight percent.

*22. A substrate for a flat panel display or photovoltaic device wherein said substrate is comprised of a flat, transparent glass exhibiting a linear coefficient of thermal expansion (CTE) over the temperature range 0–300° C. between 30–40×10$^{-7}$/° C. and a strain point of 600° C., said glass consisting essentially of an aluminosilicate having a composition as calculated in weight percent on an oxide basis, of 58–70% $SiO_2$, 12–22% $Al_2O_3$, 6.5–15% $B_2O_3$, 6–12% CaO, 0–1.9% SrO, 0–3% BaO, 0–8% MgO, SrO and BaO in combination being less than 3%, said glass containing in addition to CaO, at least one of MgO, SrO, and BaO.*

*23. A glass exhibiting a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis, consisting essentially of 58–70% $SiO_2$, 12–22% $Al_2O_3$, 6.5–15% $B_2O_3$, 6–12% CaO, 0–1.9% SrO, 0–3% BaO, 0–8% MgO, and SrO and BaO in combination being less than 3%, said glass containing in addition to CaO, at least one of MgO, SrO, and BaO.*

*24. A substrate for a flat panel display or photovoltaic device wherein said substrate is comprised of a flat, transparent glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass consisting essentially of an aluminosilicate having a composition as calculated in weight percent on an oxide basis, of 58–70% $SiO_2$, 12–22% $Al_2O_3$, 7.1–15% $B_2O_3$, 6–12% CaO, 0–1.9% SrO, 0–3% BaO, 0–8% MgO, SrO and BaO in combination being less than 3%, said glass containing in addition to CaO, at least one of MgO, SrO, and BaO.*

*25. A glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis, consisting essentially of 58–70% $SiO_2$, 12–22% $Al_2O_3$, 7.1–15% $B_2O_3$, 6–12% CaO, 0–1.9% SrO, 0–3% BaO, 0–8% MgO, and SrO and BaO in combination being less than 3%, said glass containing in addition to CaO, at least one of MgO, SrO, and BaO.*

*26. A substrate for a flat panel display or photovoltaic device wherein said substrate is comprised of a flat, transparent glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass consisting essentially of an aluminosilicate having a composition as calculated in weight percent on an oxide basis, of 60.5–70% $SiO_2$, 12–22% $Al_2O_3$, 7.1–15% $B_2O_3$, 6.1–12% CaO, 0–1.9% SrO, 0–3% BaO, 0–6% MgO, SrO and BaO in combination being less than 3%, said glass containing in addition to CaO, at least one of MgO, SrO, and BaO.*

*27. A glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis, consisting essentially of 60.5–70% $SiO_2$, 12–22% $Al_2O_3$, 7.1–15% $B_2O_3$, 6.1–12% CaO, 0–1.9% SrO, 0–3% BaO, 0–6% MgO, and SrO and BaO in combination being less than 3%, said glass containing in addition to CaO, at least one of MgO, SrO, and BaO.*

*28. A substrate for a flat panel display or photovoltaic device wherein said substrate is comprised of a flat, transparent glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass consisting essentially of an aluminosilicate having a composition as calculated in weight percent on an oxide basis, of 58–70% $SiO_2$, 15–18.9% $Al_2O_3$, 7.1–15% $B_2O_3$, 6–12% CaO, 0–1.9% SrO, 0–3% BaO, 0–8% MgO, SrO and BaO in combination being less than 3%.*

*29. A glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an*

*aluminosilicate having a composition as calculated in weight percent on an oxide basis, consisting essentially of 58–70% $SiO_2$, 15–18.9% $Al_2O_3$, 7.1–15% $B_2O_3$, 6–12% CaO, 0–1.9% SrO, 0–3% BaO, 0–8% MgO, and SrO and BaO in combination being less than 3%.*

*30. A substrate for a flat panel display or photovoltaic device wherein said substrate is comprised of a flat, transparent glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass consisting essentially of an aluminosilicate having a composition as calculated in weight percent on an oxide basis, of 60.5–70% $SiO_2$, 15–18.9% $Al_2O_3$, 7.1–15% $B_2O_3$, 6.1–12% CaO, 0–1.9% SrO, 0–3% BaO, 0–6% MgO, SrO and BaO in combination being less than 3%.*

*31. A glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis, consisting essentially of 60.5–70% $SiO_2$, 15–18.9% $Al_2O_3$, 7.1–15% $B_2O_3$, 6.1–12% CaO, 0–1.9% SrO, 0–3% BaO, 0–6% MgO, and SrO and BaO in combination being less than 3%.*

*32. A substrate for a flat panel display or photovoltaic device wherein said substrate is comprised of a flat, transparent glass exhibiting a linear coefficient of thermal expansion (CTE) over the temperature range 0–300° C. between 30–40×10$^{-7}$/° C. and a strain point over 600° C., said glass consisting essentially of an aluminosilicate having a composition as calculated in weight percent on an oxide basis, of 58–70% $SiO_2$, 15–18.9% $Al_2O_3$, 6.5–15% $B_2O_3$, 6–12% CaO, 0–1.9% SrO, 0–3% BaO, 0–8% MgO, SrO and BaO in combination being less than 3%.*

*33. A glass exhibiting a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis, consisting essentially of 58–70% $SiO_2$, 15–18.9% $Al_2O_3$, 6.5–15% $B_2O_3$, 6–12% CaO, 0–1.9% SrO, 0–3% BaO, 0–8% MgO, and SrO and BaO in combination being less than 3%.*

*34. A substrate for a flat panel display or photovoltaic device wherein said substrate is comprised of a flat, transparent glass exhibiting a linear coefficient of thermal expansion (CTE) over the temperature range 25–300° C. between 30–41.5×10$^{-7}$/° C. and a strain point over 650° C., said glass consisting essentially of an aluminosilicate having a composition as calculated in weight percent on an oxide basis, of 58–70% $SiO_2$, 12–22% $Al_2O_3$, 3.8–15% $B_2O_3$, 6–12% CaO, 0–1.9% SrO, 0–3% BaO, 0–8% MgO, SrO and BaO in combination being less than 3%, said glass containing in addition to CaO, at least one of MgO, SrO, and BaO.*

*35. A glass exhibiting a linear coefficient of thermal expansion (CTE) over the temperature range 25–300° C. between 30–41.5×10$^{-7}$/° C. and a strain point over 650° C., said glass comprising an aluminosilicate having a composition as calculated in weight percent on an oxide basis, consisting essentially of 58–70% $SiO_2$, 12–22% $Al_2O_3$, 3.8–15% $B_2O_3$, 6–12% CaO, 0–1.9% SrO, 0–3% BaO, 0–8% MgO, and SrO and BaO in combination being less than 3%, said glass containing in addition to CaO, at least one of MgO, SrO, and BaO.*

*36. A substrate for a flat panel display or photovoltaic device wherein said substrate is comprised of a flat, transparent glass exhibiting a linear coefficient of thermal expansion (CTE) over the temperature range 25–300° C. between 30–41.5×10$^{-7}$/° C. and a strain point over 650° C., said glass consisting essentially of an aluminosilicate having a composition as calculated in weight percent on an oxide basis, of 58–70% $SiO_2$, 15–18.9% $Al_2O_3$, 3.8–15% $B_2O_3$, 6–12% CaO, 0–1.9% SrO, 0–3% BaO, 0–8% MgO, SrO and BaO in combination being less than 3%.*

*37. A glass exhibiting a linear coefficient of thermal expansion (CTE) over the temperature range 25–300° C. between 30–41.5×10$^{-7}$/° C. and a strain point over 650° C., said glass comprising an aluminosilicate having a composition as calculated in weight percent on an oxide basis, consisting essentially of 58–70% $SiO_2$, 15–18.9 $Al_2O_3$, 3.8–15% $B_2O_3$, 6–12% CaO, 0–1.9% SrO, 0–3% BaO, 0–8% MgO, and SrO and BaO in combination being less than 3%.*

*38. A substrate according to claim 1 or 13, wherein the glass has a density of less than 2.50 g/cm$^3$.*

*39. A glass according to claim 14, wherein the glass has a density of less than 2.50 g/cm$^3$.*

*40. A substrate according to claim 1 or 13, wherein the glass has a liquidus temperature below about 1250° C.*

*41. A glass according to claim 14, wherein the glass has a liquidus temperature below about 1250° C.*

*42. A substrate according to claim 13, 22, 24, 26, 28, 30, 32, 48, 50, 52, or 54 wherein the glass has a strain point over 650° C.*

*43. A glass according to claim 23, 25, 27, 29, 31, 33, 49, 51, 53, or 55 wherein the glass has a strain point over 650° C.*

*44. A substrate in accordance with claim 1, 13, 22, 24, 26, 28, 30, 32, 34, 36, 48, 50, 52, or 54 wherein the glass is manufactured by the float process.*

*45. A glass in accordance with claim 14, 23, 25, 27, 29, 31, 33, 35, 37, 49, 51, 53, or 55 which is manufactured by the float process.*

*46. A flat panel display comprising a substrate in accordance with claim 13, 22, 24, 26, 28, 30, 32, 34, 36, 48, 50, 52, or 54.*

*47. A photovoltaic device comprising a substrate in accordance with claim 13, 22, 24, 26, 28, 30, 32, 34, 36, 48, 50, 52, or 54.*

*48. A substrate for a flat panel display or photovoltaic device wherein sad substrate is comprised of a flat, transparent glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass consisting essentially of an aluminosilicate having a composition as calculated in weight percent on an oxide basis, of 58–70% $SiO_2$, 15–18.9% $Al_2O_3$, 7.1–15% $B_2O_3$, 6–12% CaO, 0–1.9% SrO, 0–3% BaO, 0–8% MgO.*

*49. A glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis, consisting essentially of 58–70% $SiO_2$, 15–18.9% $Al_2O_3$, 7.1–15% $B_2O_3$, 6–12% CaO, 0–1.9% SrO, 0–3% BaO, 0–8% MgO.*

*50. A substrate for a flat panel display or photovoltaic device wherein said substrate is comprised of a flat, transparent glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass consisting essentially*

*of an aluminosilicate having a composition as calculated in weight percent on an oxide basis, of 60.5–70% $SiO_2$, 15–18.9% $Al_2O_3$, 7.1–15% $B_2O_3$, 6.1–12% CaO, 0–1.9% SrO, 0–3% BaO, 0–6% MgO.*

*51. A glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis, consisting essentially of 60.5–70% $SiO_2$, 15–18.9% $Al_2O_3$, 7.1–15% $B_2O_3$, 6.1–12% CaO, 0–1.9% SrO, 0–3% BaO, 0–6% MgO.*

*52. A substrate for a flat panel display or photovoltaic device wherein said substrate is comprised of a flat, transparent glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis that comprises 58–70% $SiO_2$, 15–18.9% $Al_2O_3$, 7.1–15% $B_2O_3$, 6–12% CaO, 0–1.9% SrO, 0–3% BaO, 0–8% MgO.*

*53. A glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis that comprises 58–70% $SiO_2$, 15–18.9% $Al_2O_3$, 7.1–15% $B_2O_3$, 6–12% CaO, 0–1.9% SrO, 0–3% BaO, 0–8% MgO.*

*54. A substrate for a flat panel display or photovoltaic device wherein said substrate is comprised of a flat, transparent glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis that comprises 60.5–70% $SiO_2$, 15–18.9% $Al_2O_3$, 7.1–15% $B_2O_3$, 6.1–12% CaO, 0–1.9% SrO, 0–3% BaO, 0–6% MgO.*

*55. A glass exhibiting a density of less than 2.50 g/cm$^3$, a linear coefficient of thermal expansion (CTE) over the temperature range 0–300° C. between 30–40×10$^{-7}$/° C. and a strain point over 600° C., said glass comprising an aluminosilicate having a composition as calculated in weight percent on an oxide basis that comprises 60.5–70% $SiO_2$, 15–18.9% $Al_2O_3$, 7.1–15% $B_2O_3$, 6.1–12% CaO, 0–1.9% SrO, 0–3% BaO, 0–6% MgO.*

*56. A substrate in accordance with claim 1, 13, 22, 24, 26, 28, 30, 32, 34, 36, 48, 50, 52, or 54 wherein the glass is essentially free of intentionally added alkali metal oxide.*

*57. A glass in accordance with claim 14, 23, 25, 27, 29, 31, 33, 35, 37, 49, 51, 53, or 55 wherein the glass is essentially free of intentionally added alkali metal oxide.*

* * * * *